Patented Jan. 1, 1929.

1,697,137

UNITED STATES PATENT OFFICE.

ALFRED PONGRATZ AND ALOIS ZINKE, OF GRAZ, AUSTRIA, ASSIGNORS TO FELICE BENSA, OF GENOA, ITALY.

PROCESS FOR QUANTITATIVELY HALOGENATING PERYLENE AND ITS DERIVATIVES.

No Drawing. Application filed September 30, 1925, Serial No. 59,738, and in Austria December 19, 1924.

This invention relates to a process by which the halogenation of perylenes may be more effectively accomplished and in some cases only can be accomplished, if the action takes place while the perylene or perylene derivatives are in the state of solution.

By this process, perylene dichloride, tetrachloride, pentachloride or hexachloride, and other chlorine compounds of perylene may be obtained in satisfactory quantities and of very pure quality. As solvents in the process, compounds like nitrobenzene may be used.

Example 1.—Perylene dichlorine.

One part of perylene is dissolved in twenty parts of nitrobenzene; a mixture of two parts of concentrated hydrochloric acid and eighteen parts of glacial acetic acid from one dropping funnel, and a second mixture of 0.9 parts of perhydrol (Merck's peroxide of hydrogen) and eight parts of glacial acetic acid from another dropping funnel, are allowed to flow drop by drop into the perylene solution in one and a half hours, at a temperature of ninety degrees centigrade. After the reaction is completed, the resulting mixture is allowed to cool for twenty four hours for crystallizing, the perylene dichloride thus obtained, crystallizing readily in the raw state. The product is only slightly soluble in low boiling point solvents, such as alcohol, ether and glacial acetic acid; more readily soluble in benzol and xylol, and still more readily soluble in aniline and nitrobenzene in the heat from which it crystallizes in brownish yellow needles. In cold concentrated sulphuric acid it is only slightly soluble but is readily soluble in hot sulphuric acid, with an ultramarine blue color. The fusing temperature of the pure product is 280° centigrade.

Analysis: calculated 22.09% of chlorine, found 22.10% of chlorine.

Example 2.—Perylene tetrachloride.

One part of perylene is dissolved in sixty parts of nitrobenzene in the heat. A mixture of five parts of concentrated hydrochloric acid, and thirty five parts of glacial acetic acid and a second mixture of 1.8 parts of Merck's perhydrol and sixteen parts of glacial acetic acid, are caused to flow drop by drop into the solution at a temperature of ninety degrees centigrade during a time period of three hours. After cooling the mixture is permitted to crystallize for twenty four hours. The raw product is obtained in a pure state by successive crystallizations from nitrobenzene, aniline and xylol. It is reddish orange in color and crystallizes in fine hair like needles. In the low boiling point solvents such as alcohol, acetone and glacial acetic acid it is only slightly soluble but more readily soluble in benzol and xylol. The solutions are yellow in color and show a green fluorescence. In concentrated sulphuric acid it dissolves with difficulty when cold, but when heated it dissolves therein with a violet color. The fusing point of the pure product is 350° centigrade.

Analysis:—calculated 36.38% of chlorine, found 36.64% of chlorine.

Example 3.—Perylene hexachloride.

One part of perylene is dissolved in the heat with seventy five parts of nitrobenzene, and as in Examples 1 and 2, a mixture of six parts of concentrated hydrochloric acid and 30 parts of glacial acetic acid, and at the same time a second mixture of 2.7 parts of Merck's perhydrol and five parts of glacial acetic acid, are caused to flow drop by drop into the solution at a temperature of ninety degrees centigrade during the time period of one hour, after which the mixture is permitted to crystallize for twelve hours. The perylene hexachloride crystallizes in fine, bright yellow needles and may be readily re-crystallized from xylol, nitrobenzene and aniline. The solutions in benzol, xylol and other similar solvents are yellow in color, and show an intense yellowish green fluorescence. In concentrated sulphuric acid it does not dissolve in the cold and only to a slight extent when heated slightly. The color of the solution is blue, soon changing to red. The point of fusion is 356 to 357 degrees centigrade.

Analysis:—calculated 46.37% of chlorine, found 45.30% of chlorine.

Example 4.—Dichloride of isoviolanthron.

One part of finely pulverized isoviolanthron is mixed with twenty parts of nitrobenzene and the mixture is heated to ninety degrees centigrade. To this, a mixture of four parts of concentrated hydrochloric acid, and ten parts of glacial acetic acid and a second mixture of two parts of perhydrol and eights of glacial acetic acid are added drop by drop during one hour. When the reaction is completed the acetic acid is removed by means of water and the nitrobenzene is blown off by steam. The remaining dichloride of isoviolanthron is a dark, violet brown powder.

*Example 5.*

One part of 3.10 perylene quinone is dissolved in one hundred parts of nitrobenzene. To this, a mixture of two parts of concentrated hydrochloric acid, and five parts of glacial acetic acid, and a second mixture of one part of perhydrol and five parts of glacial acetic acid are added drop by drop, during one hour, at a temperature of ninety five degrees centigrade, after which two thirds of the liquid are distilled off. On cooling, a dichloride of perylene quinone, crystallized in needles, is deposited.

We claim:—

1. A process for halogenating perylene by the action of nascent halogens consisting in dissolving the said perylene in a solvent inert to nascent and elementary halogen and gradually introducing into the solution a halogen compound and at the same time a substance capable of liberating from such compound the halogen, the said halogen compound and the halogen liberating substance being added in quantities calculated to liberate from the halogen compound the quantity of halogen to be introduced into the perylene and the quantity of the solvent and its temperature being sufficient to hold in solution the perylene produced.

2. A process for halogenating perylene by the action of nascent halogens consisting in dissolving the said perylene in nitrobenzene and gradually introducing into the solution a halogen compound and at the same time a substance capable of liberating from such compound the halogen, the said halogen compound and the halogen liberating substance being added in quantities calculated to liberate from the halogen compound the quantity of halogen to be introduced into the perylene and the quantity of the nitrobenzene and its temperature being sufficient to hold in solution the perylene and the halogenated perylene produced.

3. A process for halogenating perylene by the action of nascent halogens consisting in dissolving the said perylene in nitrobenzene and in gradually introducing into the solution hydrochloric acid and peroxide of hydrogen in quantities calculated to liberate from the hydrochloric acid the quantity of chlorine to be introduced into the perylene and the quantity of nitrobenzene and its temperature being sufficient to hold in solution the perylene and the chlorinated perylene product.

4. A process for halogenating perylene by the action of nascent halogens consisting in dissolving the said perylene in nitrobenzene and in gradually introducing into the solution hydrochloric acid and peroxide of hydrogen in quantities calculated to liberate from the hydrochloric acid the quantity of chlorine to be introduced into the perylene and the quantity of nitrobenzene and its temperature being sufficient to hold in solution the perylene and the chlorinated perylene product, the hydrochloric acid and the peroxide of hydrogen being diluted with glacial acetique acid.

In testimony whereof we have affixed our signatures.

ALFRED PONGRATZ.
ALOIS ZINKE.